J. B. VAN DYNE.
Fire-Extinguisher.

No. 162,718. Patented April 27, 1875.

WITNESSES:
G. Mathews.
C. A. Pettit.

INVENTOR:
J. B. Van Dyne
BY
ATTORNEYS.

UNITED STATES PATENT OFFICE.

JACOB B. VAN DYNE, OF LOUISVILLE, KENTUCKY.

IMPROVEMENT IN FIRE-EXTINGUISHERS.

Specification forming part of Letters Patent No. 162,718, dated April 27, 1875; application filed July 30, 1874.

CASE A.

*To all whom it may concern:*

Be it known that I, JACOB B. VAN DYNE, of Louisville, in the county of Jefferson and State of Kentucky, have invented a new and Improved Fire-Extinguisher; and I do hereby declare that the following is a full, clear, and exact description of the same, reference being had to the accompanying drawing, forming a part of this specification, in which—

Figure 1:
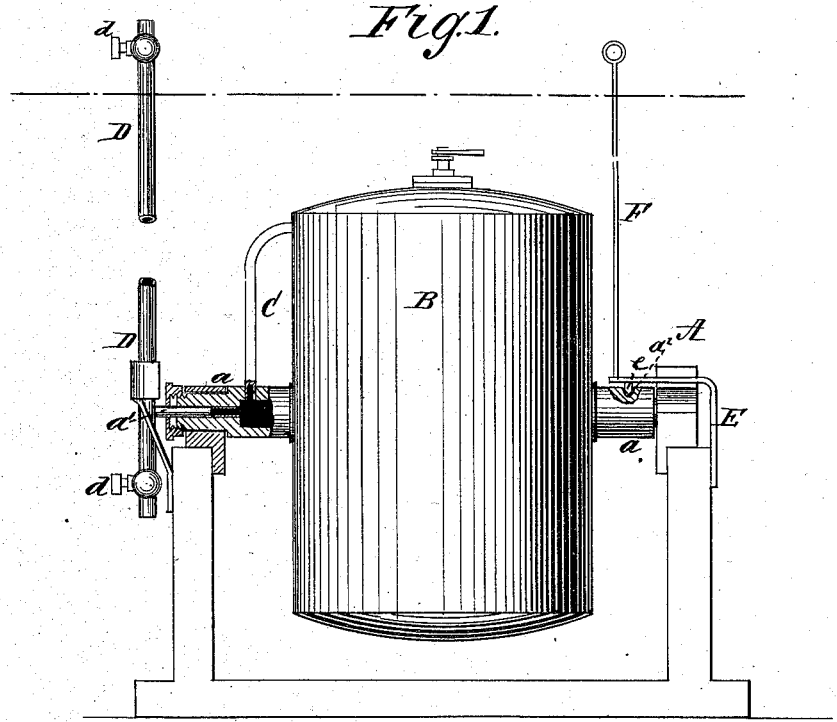
Figure 2:
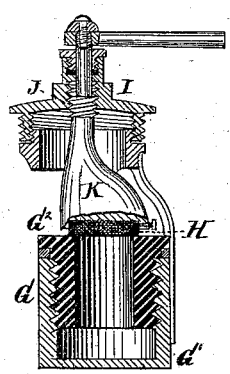

Figure 1 is an elevation, partly in section; Fig. 2, a vertical section of the cam-holder employed with stopper of acid-vessel.

The invention relates to fire-extinguishers that mix the chemicals by inversion, and consists in certain features of improvement which are hereinafter described and claimed.

A represents a fire-extinguisher, having trunnions $a\ a$, one of which is chambered, and connected with the vessel B by a pipe, C, and has an end pipe or hose attachment, $a^1$. With the latter I connect a pipe, D, extending to the story above in a building, and having a suitable cock, $d$. E represents an angled spring, having a subjacent stud, $e$, that catches in a hole, $a^2$, of trunnion, and prevents the vessel B from tilting and mixing the chemicals. This spring is provided with a rod, F, which extends into the chamber above.

By combining this pipe C, spring-latch E, and rod F with a pivoted extinguisher I can use the latter not only in the story on which it is located, but upon any one either above or below.

G is the acid-vessel, which is made with a leaden body $G^1$ and glass cover $G^2$, each being formed with a corresponding thread, by which they may be conveniently coupled together.

The stopper H is made of lead or rubber, which, being used in contact with glass, will form a tight joint without sticking. On the other hand, rubber and lead stoppers, with a leaden or rubber cover, when jointed, cohere together with so much force that they can only be separated with the greatest difficulty and delay. Hence, by providing my acid-vessel with a glass cover, and leaden or rubber stopper, I overcome a difficulty now existing, and enable the stopper to be removed with facility and dispatch.

By means of this arrangement of a leaden vessel with a glass mouth-piece I secure double advantages, the leaden vessel obviating all danger of fracture in handling, and the glass mouth-piece effectually preventing the adhesion of the leaden stopper.

I know that it is not new to use a leaden stopper with a glass vessel, and disclaim this idea broadly; but what I do claim is, the combination of the leaden vessel, glass mouth-piece, and leaden stopper, whereby all of the objections to a lead vessel with a lead stopper, and a glass vessel with a lead stopper, taken singly, are obviated, and yet all the advantages of both are preserved.

In order to apply the stopper H I employ a nut and screw, I J, and cam K, whereby I can advance and tighten the stopper, as well as transfer it from one side to its place in the cover $G^2$ by the same movement.

In charging the extinguisher for use, I turn the stopper K tightly upon the acid-vessel, after filling the same, before introducing it into the extinguisher, and then open it again after the acid-vessel is introduced and the cap screwed down, the object being to avoid slopping the acid outside the vessel while screwing its holder into its place in the extinguisher. The extinguisher being now ready for operation from any floor, all that is necessary is to elevate the rod F, which action causes the extinguisher to become inverted, from the shifting of the center of gravity, and, the chemicals being mixed, the effective power of the extinguisher is transmitted up the stand-pipe D to the locality to which it is to be directed.

Having thus described my invention, what I claim as new is—

1. The angle-spring E, having subjacent stud $e$, and provided with a rod, F, in combination with a trunnioned fire-extinguisher, as and for the purpose described.

2. The combination of nut and screw I J and cam K, to remove or replace the stopper, in the manner specified.

3. A trunnioned fire-extinguisher, having a hollow trunnion, in combination with a stand-pipe having a swiveled connecting-pipe, and the latching devices, consisting of the spring E, catch-stud e, and rod F, substantially as shown and described.

4. In a chemical fire-extinguisher, the combination of a leaden acid-vessel, a glass cover or mouth-piece, and a leaden stopper, for the purpose specified.

J. B. VAN DYNE.

Witnesses:
SOLON C. KEMON,
CHAS. A. PETTIT.